(12) United States Patent
Ponsonnaille et al.

(10) Patent No.: US 6,659,518 B2
(45) Date of Patent: Dec. 9, 2003

(54) BUMPER BAR FOR A MOTOR VEHICLE WITH AN INTERMEDIATE WEB

(75) Inventors: Jean-Philippe Ponsonnaille, Beauvais (FR); Thierry Renault, Vernon (FR)

(73) Assignee: Peguform France, St. Marcel (FR)

( * ) Notice: Subject to any disclaimer, the term of this patent is extended or adjusted under 35 U.S.C. 154(b) by 0 days.

(21) Appl. No.: 10/229,236

(22) Filed: Aug. 27, 2002

(65) Prior Publication Data

US 2003/0052493 A1 Mar. 20, 2003

(30) Foreign Application Priority Data

Aug. 28, 2001 (FR) ............................................. 0111169

(51) Int. Cl.[7] .............................................. B60R 19/02
(52) U.S. Cl. ...................................................... 293/102
(58) Field of Search ................................. 293/102, 103, 293/120, 132, 133, 135, 136

(56) References Cited

U.S. PATENT DOCUMENTS

| 3,827,740 | A | * | 8/1974 | Golze et al. | |
| 3,995,901 | A | * | 12/1976 | Filbert, Jr. et al. | |
| 3,997,207 | A | * | 12/1976 | Norlin | |
| 4,078,348 | A | * | 3/1978 | Rothman | 52/309.7 |
| 5,141,273 | A | * | 8/1992 | Freeman | 293/120 |
| 5,201,912 | A | | 4/1993 | Terada et al. | |
| 5,340,178 | A | | 8/1994 | Stewart et al. | |
| 5,727,826 | A | * | 3/1998 | Frank et al. | 293/102 |
| 6,290,272 | B1 | * | 9/2001 | Braun | 293/120 |

FOREIGN PATENT DOCUMENTS

| DE | 3144844 | * | 6/1982 | 293/102 |
| EP | 0395 343 | | 10/1990 | |
| EP | 0625 104 | | 11/1994 | |
| JP | 55-102746 | * | 8/1980 | 293/120 |
| JP | 4-218445 | * | 8/1992 | 293/120 |
| JP | 6-40298 | * | 2/1994 | 293/135 |

\* cited by examiner

*Primary Examiner*—Dennis H. Pedder
*Assistant Examiner*—H. Gutman
(74) *Attorney, Agent, or Firm*—Brooks Kushman P.C.

(57) ABSTRACT

The invention relates to a bumper bar (2) for a motor vehicle, comprising front (4) and rear (6) walls and an intermediate web (14) extending from the front wall to the rear wall so as to form with the latter an "H"-shaped section. The web has an undulating shape in cross section.

22 Claims, 4 Drawing Sheets

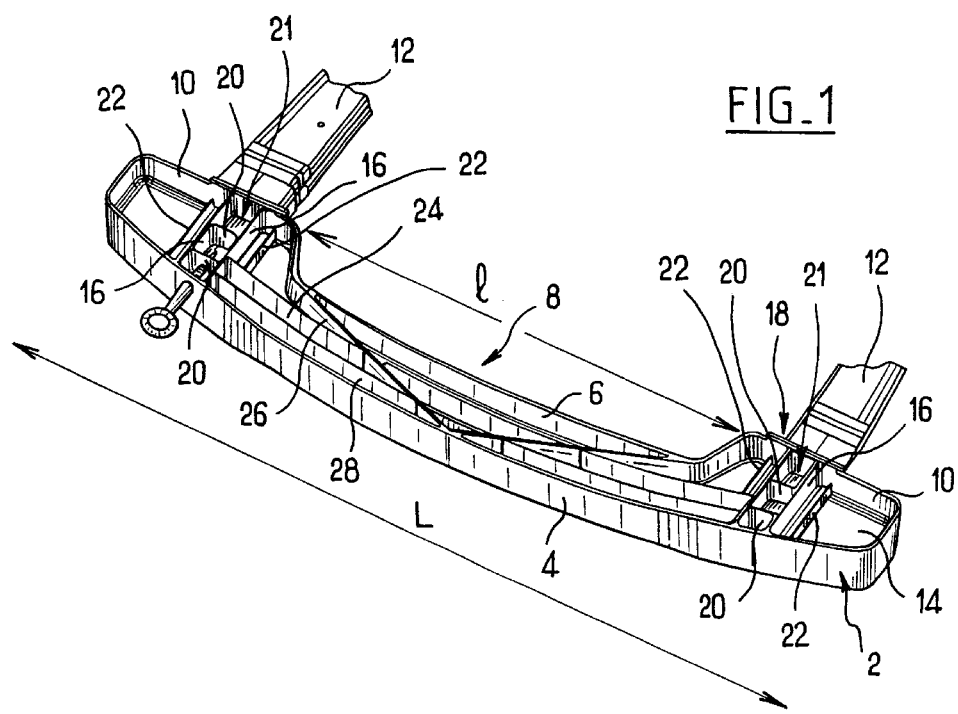
FIG_1
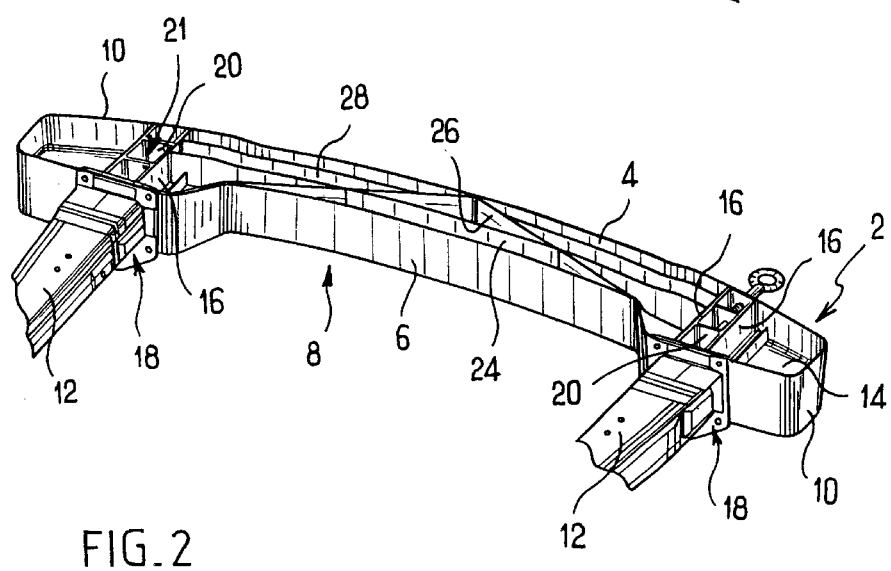
FIG_2

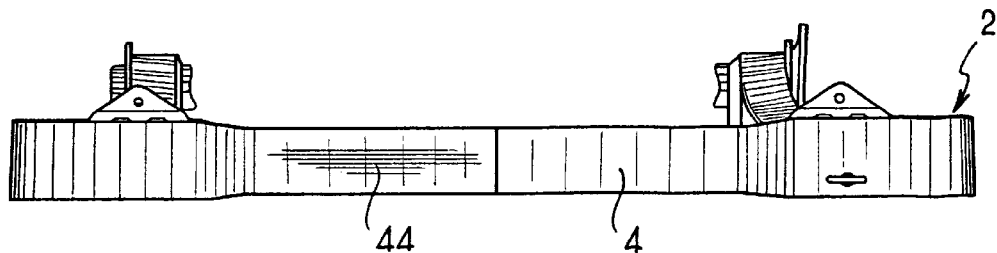
FIG_3
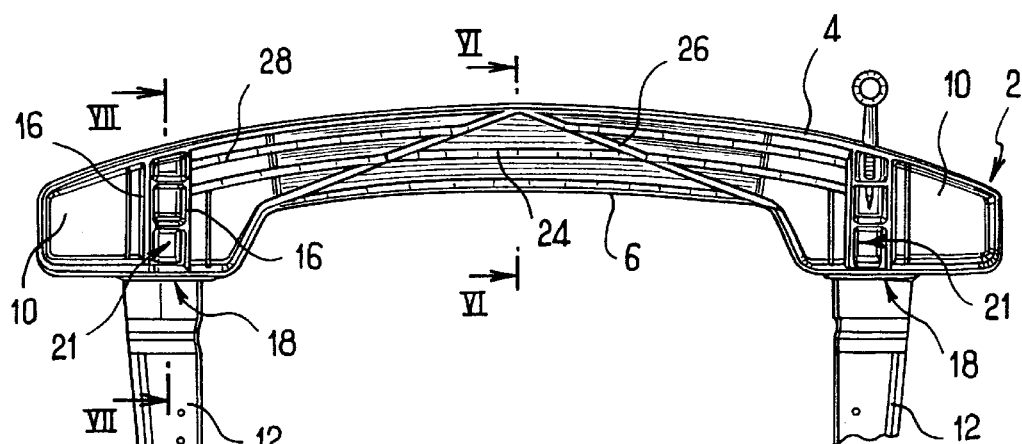
FIG_4
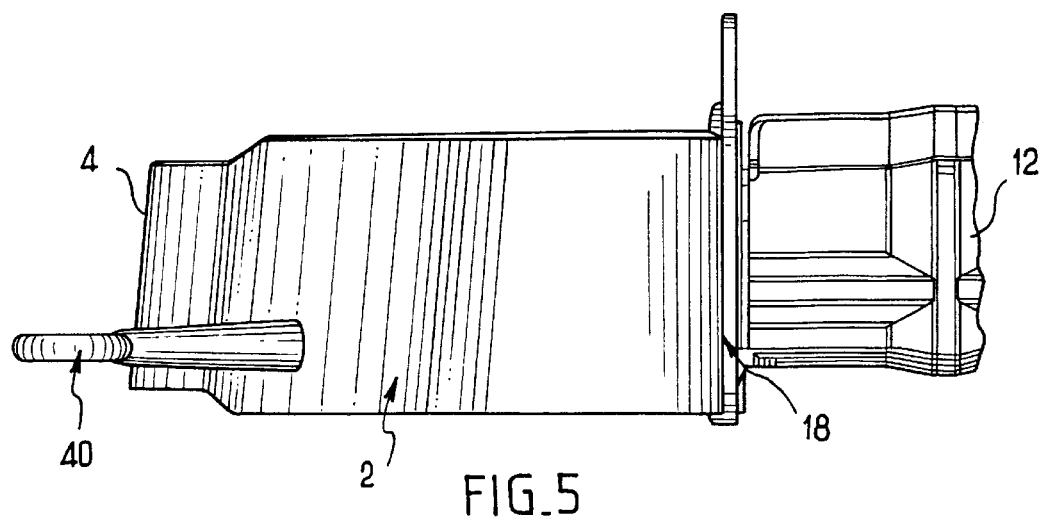
FIG_5

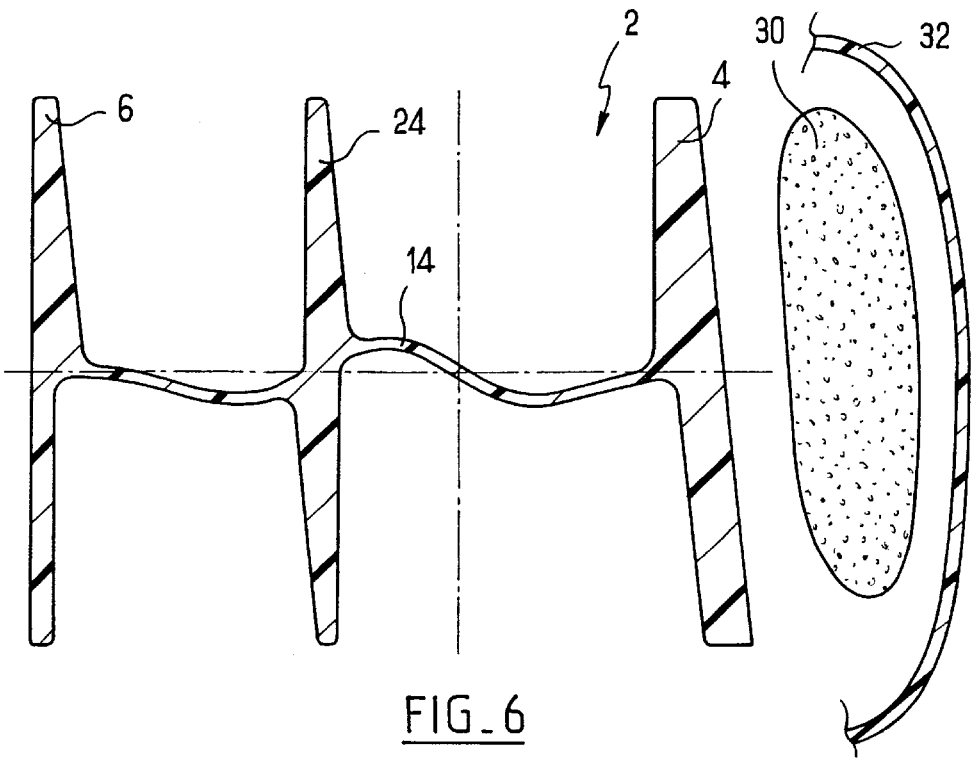
FIG_6
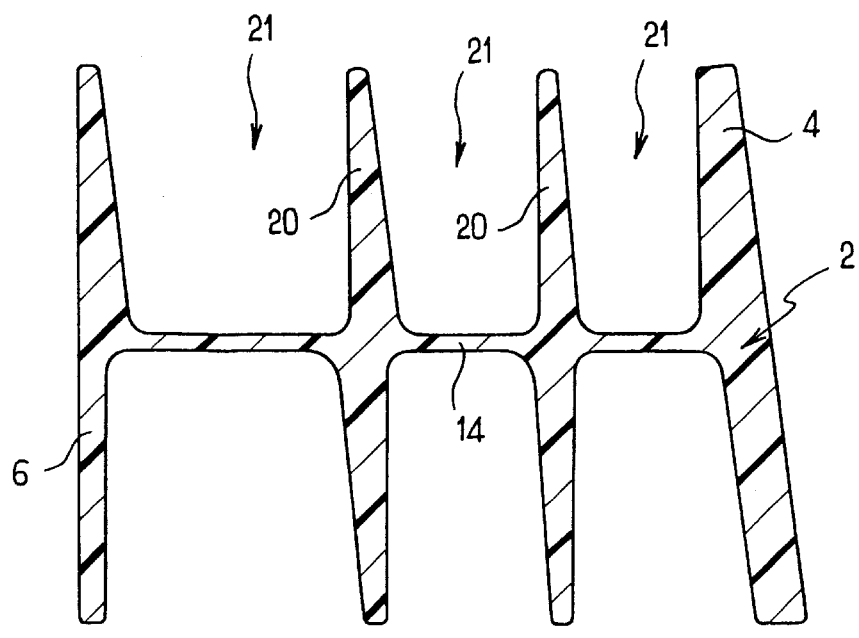
FIG_7

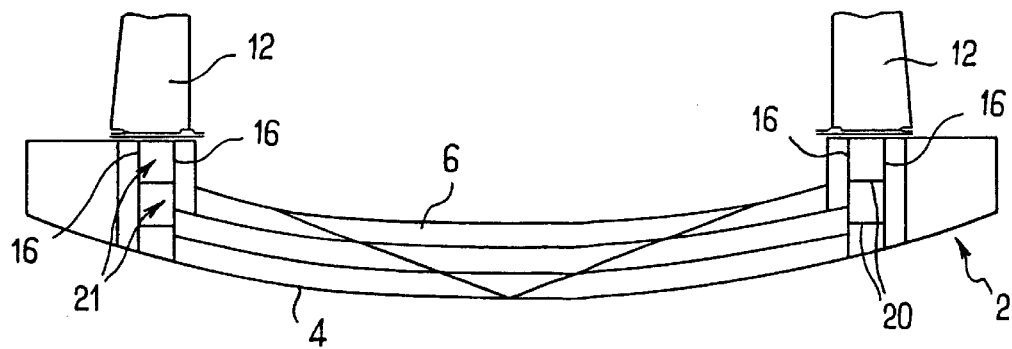
FIG_8
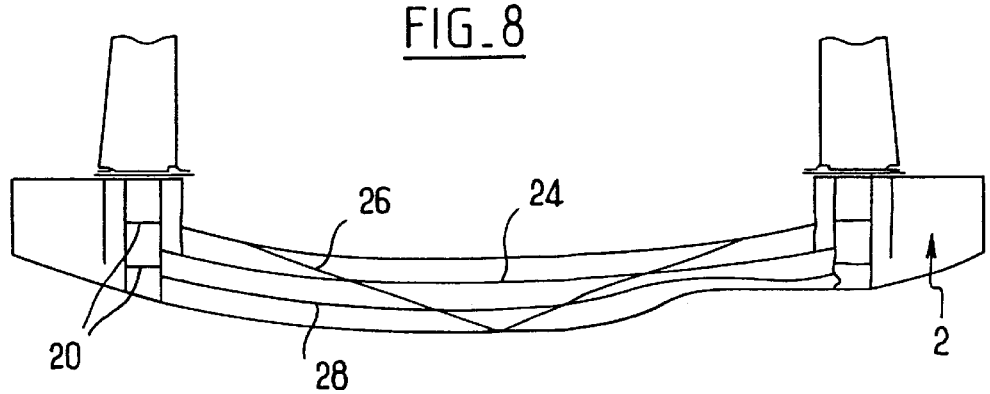
FIG_9
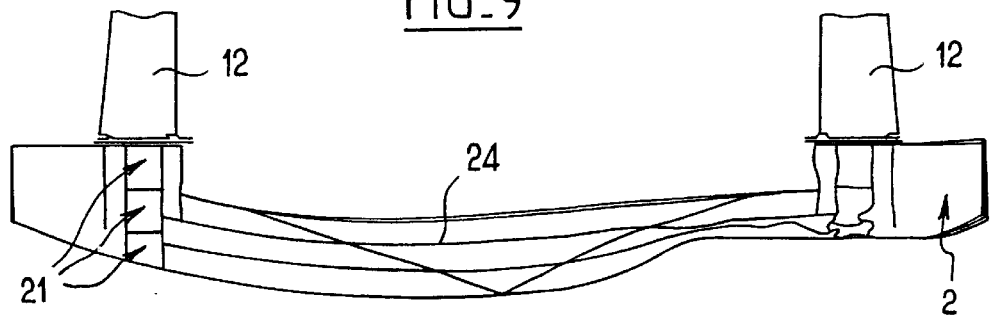
FIG_10
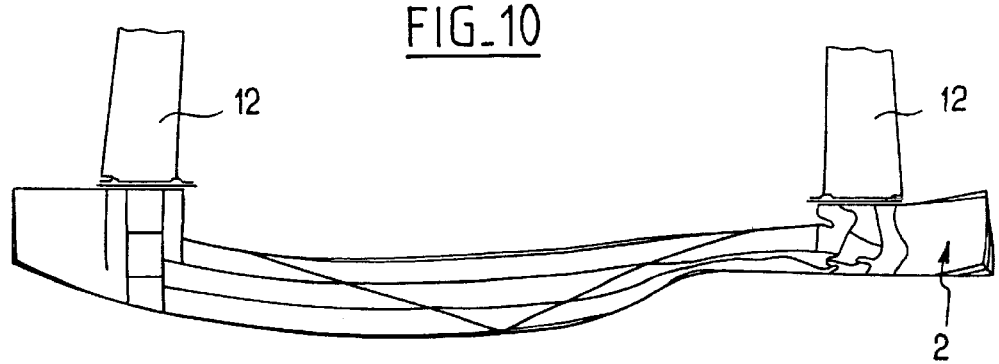
FIG_11 ated by forces in the United States of America. There
BUMPER BAR FOR A MOTOR VEHICLE WITH AN INTERMEDIATE WEB

TECHNICAL FIELD

The invention relates to bumper bars for a motor vehicle, whether these are front bumpers or rear bumpers.

BACKGROUND ART

It is known that the behavior of vehicle bumpers in the case of an impact can be studied by means of various tests more or less standardized, in particular, by the regulations in force in Europe and in the United States of America. There are essentially four such tests.

First of all, there is the test known as the "parking impact" test. It takes place at four kilometers/hour in Europe and at eight kilometers/hour in the United States. In the course of this test, only the absorber of the bumper is supposed to be deformed, without prejudice to the bumper bar itself.

Another of these tests is that known as the "pedestrian impact" test. It is intended to reduce as far as possible the injuries suffered by a pedestrian when struck by a vehicle at low speed.

Another of these tests is that known as the "urban impact" test. In Europe, it is also called the "DANNER" impact or "repairability impact". In the course of this test, the vehicle strikes a rigid wall at a speed of sixteen kilometers/hour, the wall extending over 40% of the width of the vehicle. In the course of this impact, the bumper should be damaged preferentially so as to protect the chassis of the vehicle, especially the longitudinal members.

Finally, the fourth test is that known as the "high-speed compatibility impact" test. In the course of this test, the vehicle strikes a barrier covering 40% of the width of the vehicle at sixty kilometers/hour. This standardized barrier comprises a deformable aluminum buffer with a honeycomb structure rated at 50 psi (compression load), this buffer being followed by a honeycomb wall likewise rated at 50 psi. During this impact, the bumper bar, which is mounted on the longitudinal members of the vehicle, should be capable of deforming the barrier in a uniform manner without tearing the latter. In particular, tearing of the barrier by the longitudinal member of the vehicle should be avoided. The bar must not break and should deform the barrier until it is bearing on the engine. It is a matter of ensuring that the bar deforms the buffer, starts to deform the barrier and, without the bar breaking and in the course of the crumpling of the barrier, the longitudinal member itself begins to crumple. Once the bar is bearing on the engine, it is considered to have played its part. To avoid piercing the barrier with the longitudinal member, it is important to distribute the force over the entire bearing surface of the bar. Another thing that should be avoided is the bar wrapping itself around the barrier. To pass this test, the bar must be rigid so as to distribute the forces over the barrier.

In this context, bumper bars made of steel or aluminum have been proposed. However, bars made of steel are found to be very heavy, while bars made of aluminum are relatively expensive.

Bars made of a composite material based on plastic, possibly reinforced with glass fibers, have likewise been proposed. However, these bars generally do not have an appropriate impact resistance. In fact, they break into several pieces or are not rigid enough to deform the barrier in the case of a high-speed impact.

The patent EP-0 625 104 discloses a bumper bar with an H-shaped section provided with a network of oblique transverse ribs extending between the front and rear walls of the bar along the entire length of the latter. This bar is designed to pass the "parking impact" tests required on the American market.

SUMMARY OF THE INVENTION

It is an object of the invention to provide a bumper bar which behaves well during an urban impact and to an acceptable standard during a high-speed impact as well as during a "parking"-type impact or a collision with a pedestrian, but is not prohibitively heavy or prohibitively expensive to manufacture.

To achieve this object, the invention provides a bumper bar for a vehicle, comprising front and rear walls and an intermediate web extending from the front wall to the rear wall so as to form with the latter an "H"-shaped section, the web having an undulating shape in cross section.

In experiments, the applicant has surprisingly found that the shape of this web improved very considerably the behavior of the bar during an impact, in particular during an urban impact. In fact, the undulating shape allows the web to concertina during a frontal impact, such that the bar poses moderate resistance to crumpling in the sections where the web is present. In contrast to a conventional "H"-section bar with a strictly flat web, in which the web plays a dominant role in guiding the crumpling of the bar, in the bar according to the invention the undulating web plays a minor role in guiding the crumpling, the crumpling being determined in large measure by other parts of the bar. However, the behavior of the bar during the impact can be significantly influenced by modifying the amplitude of the undulation and the dimensions of the web, in particular its thickness.

Of course, during any of the impacts mentioned above, the overall structure of the bar influences its behavior. Thus, even if certain parts of the bar have a decisive effect on this behavior, it remains difficult to identify precisely the exact role played by any particular part of the bar. This is the case particularly with the undulating web mentioned above, the function of which during an impact depends on the construction of other parts of the bar (possible presence of ribs, intermediate walls, transverse walls etc).

The bar according to the invention could likewise have at least one of the following characteristics:

- it has at least one zone in which, in cross section, the web has an average thickness less than average thicknesses of the front and rear walls;
- the average thickness of the web is between 0.25 and 0.75 times the average thickness of each front and rear wall;
- there are at least two zones, and said zones are each closer to the respective ends of the bar than to the middle of the bar;
- in two zones each closer to the respective ends of the bar than to the middle of the bar, it comprises at least one rib perpendicular to the front and rear walls and to the web;
- there are at least two ribs in each zone;
- the ribs of each zone are connected to one another by reinforcing ribs, in particular ribs parallel to the front and rear walls;
- in two zones each closer to the respective ends of the bar than to the middle of the bar, it comprises at least one cell extending between the front and rear walls;
- the zones extend at right angles to a location for fixing the bar to longitudinal members;

it comprises at least one internal wall parallel to the front and rear walls;

there are at least two internal walls;

it comprises, in particular in a central zone of the bar, at least one intermediate wall at an angle to the front and rear walls and perpendicular to the web;

the intermediate wall forms a "V" when viewed from above;

the point of the "V" extends in the direction of the front wall;

the length of the central zone is at least equal to one third of the total length of the bar;

it is produced from plastic material reinforced by glass fibers; and the fibers are unidirectional and continuous, at least in the front and rear walls;

According to the invention, a bumper bar for a vehicle comprising a bar according to the invention and a skin is also provided.

Other characteristics and advantages of the invention will become apparent from the following description of a preferred embodiment given by way of example, which is not intended to be restrictive.

BRIEF DESCRIPTION OF THE DRAWINGS

FIGS. 1 and 2 are two perspective views from below of a bumper bar according to one preferred embodiment of the invention and of two vehicle longitudinal members, to which the bar is fixed, one of the longitudinal members being shown partially;

FIGS. 3, 4 and 5 are three views, from the front, from below and from the right, respectively, of the bar and of the longitudinal members in FIGS. 1 and 2;

FIGS. 6 and 7 are two sectional views of the bar in FIG. 4 in the planes VI—VI and VII—VII respectively; and FIGS. 8 to 11 are views similar to FIG. 4 illustrating four stages of the deformation of the bar during an urban impact.

DETAILED DESCRIPTION OF THE PREFERRED EMBODIMENTS

In the embodiment illustrated in the figures, the general shape of the bar 2 is elongate and essentially rectilinear although, in plan view, it is slightly curved. The bar is intended to extend horizontally and transversely to the direction of motion of the vehicle. The bar 2 comprises a front wall 4 forming the front face of the bar along the entire length of the latter. This wall is vertical and essentially curved along the length of the bar. The bar comprises a rear wall 6 which is also vertical and curved, the rear wall 6 extending at a distance from the front wall 4 and parallel to the latter. In a central zone of the bar with reference to the length of the latter, the rear wall 6 has a central zone or reinforcement 8 in the direction of the front wall 4. At the level of the central zone, the distance between the front and rear walls is thus shorter than at the level of their ends. Here, the central zone 8 has a length 1 substantially equal to half the total length L of the bar. The front and rear walls meet at the ends of the bar to form lateral end faces of the latter.

At the level of the end sections 10 of the bar, the rear wall 6 forms two locations 18 for fixing the bar to longitudinal members (12) of the vehicle. These longitudinal members are part of the chassis of the vehicle and are intended to extend in the direction of motion of the vehicle, parallel to one another and at a distance from one another. The bar is intended to be fixed to the front ends of the longitudinal members, as illustrated.

With reference in particular to FIGS. 6 and 7, the bar comprises a web 14, which is essentially flat and horizontal and, in this case, extends over the entire length of the bar, halfway up the latter. The web 14 extends from a rear face of the front wall 4 to a front face of the rear wall 6. The portion of the web 14 extending at right angles to the central zone 8 has a slightly undulating shape from the front to the rear, as is apparent from FIG. 6, which illustrates the profile of the bar in cross section, halfway between its ends. In contrast, in the present case the web is strictly flat at the level of the end sections 10 on either side of the central zone 8, as is apparent from FIG. 7, which shows the profile of one end 10 of the bar in cross section.

In each end section 10, the bar comprises ribs 16 adjoining the fixing locations 18. In the present case, there are two ribs in each end section 10. They are flat, parallel to one another, perpendicular to the front wall, spaced apart from one another and vertical. Each rib extends from the rear face of the front wall 4 to the front face of the rear wall 6. The two ribs 16 extend substantially over the entire height of the bar and of the walls 4 and 6.

In each end section 10, the bar furthermore comprises reinforcing ribs 20, of which there are two for example. These ribs are vertical, parallel to one another, perpendicular to the ribs 16 and to the web 14 and spaced apart from one another. They extend between the two ribs 16, from one to the other. In this way, the two ribs 16 and the two ribs 20 together form three cells 21 of a substantially cubic general shape. These three cells are aligned and extend toward the front as an extension of the corresponding longitudinal member 12.

The end section 10 furthermore comprises secondary ribs 22 extending on either side of the ribs 16, parallel to and at a distance from the latter but slightly above and below the web 14 (by an amount equal to half the height of the ribs 16, for example).

The bar comprises a first internal wall 24 extending parallel to the front wall 4 and rear wall 6, between the latter and at a distance from them. The height of the wall 24 is substantially equal to that of the walls 4 and 6 and it extends above and below the web 14. The ends of the internal wall 24 adjoin the two ribs 16 closest to the center of the bar, and said wall does not extend laterally beyond these ribs 16.

The bar comprises an intermediate wall 26 formed in two parts by two flat and vertical sections. Each section extends perpendicularly to the web 14 from the middle of the front wall 4 to the rear wall 6 at one of the respective ends of the reinforcement. Each of the sections is thus at an angle to the front wall 4 and rear wall 6. In plan view, the two sections form a "V", the point of which points toward the front of the vehicle.

The bar furthermore comprises a second internal wall 28, the shape and arrangement of which are identical to those of the first internal wall 24 and which extends between the latter and the front wall 4. However, the second internal wall 28 is interrupted between the two sections forming the intermediate wall 26, unlike the first internal wall 24, which extends continuously between the branches of the "V".

Some examples of dimensions relating to the bar are given below. In the section illustrated in FIG. 6, the height of the front wall 4 is 95 mm. The height is measured vertically in this figure. The thickness of this wall, at its top, measured horizontally in the figure, is 4 mm. The thickness of the base of the upper part of the front wall 4, adjoining the web 14, is 9 mm. The equivalent thicknesses for the rear wall 6 are 7 and 12 mm respectively. For the internal wall 24, the thicknesses are 3 and 8 mm respectively. Over its entire section, the web has a constant thickness of 2 mm. The thicknesses of these walls below the web are of the same order of magnitude as those which have just been given for the upper parts of the these walls. In the present case, the thickness of the web is less than the smallest thickness of these walls and, on average, is less than 0.75 times, in the present case less than 0.5 times, the average thickness of these walls.

The amplitude of the undulation of the web 14 will be between 1 and 5 times the average thickness of this web, for example, in the present case between 2 and 10 mm. In the present case, the length of the undulation is chosen in such a way that the web completes exactly one complete oscillation between the front wall 4 and the rear wall 6, this undulation having the shape of a sinusoidal curve. It will be seen from FIG. 6 that the first internal wall 24 does not interrupt the undulation, which extends geometrically as though this wall were absent. It is the same for the second internal wall and the intermediate wall in the sections concerned. The undulation starts downward from the front wall 4.

At the level of the end sections 10, the thickness of the web will preferably be less than its thickness where it faces the central zone 8 so as to favor the crushing of the cells 21.

All the walls and ribs extend above and below the web.

The bar is made from a composite material based on plastic, such as polypropylene reinforced with glass fibers 44, as illustrated schematically in FIG. 3. The fibers will preferably be continuous unidirectional fibers, i.e. fibers which extend locally parallel one to the other. The material used could be of the stampable reinforced thermoplastic type. A material of this kind is traditionally formed by compressing a pile of layers of plastic material alternating with layers of glass fiber. This material and numerous other materials can be used to produce the bar. The bar will preferably be produced by means of a press, in which a plurality of preheated blanks of the material will be arranged, the material flowing within the press to form the different parts of the bar when the press is closed. Since this method of production is known per se, it will not be described further here. The bar is thus produced in one piece with the absorbers formed by the ribs 16 and 20.

Of course, the bumper may also comprise a shock-absorbing material 30, such as a foam extending in front of the front wall 4, and, in front of the latter, a bumper skin 32 visible from the outside of the vehicle, which will conceal the absorber and the bar from view.

The bar which has just been described has satisfactory behavior when subjected to a "DANNER"-type impact.

The network of cells 21 and of ribs 16, 20 present in each end section 10, facing the longitudinal members, makes it possible for the energy of the "DANNER" impact to be absorbed by progressive crumpling of the ribs. This is evident particularly from FIGS. 8 to 11, which illustrate four stages of the crumpling of the bar in the course of a "DANNER" impact. The thickness and position of the ribs 16, 20 can easily be adjusted to ensure that the level of force absorbed as a function of the degree of intrusion during impact is constant. The rigidity of the end sections 10 with the cells 21 makes it possible to react to the urban impact without inducing excessive local stresses in the barrier.

Owing to the fact that this crumpling is essentially guided by the ribs 16 and 20 rather than by the web 14, the bar is not destabilized during the impact. This is likewise due to the fact that the web is thin and has an undulating shape so as to fold upon itself during the impact, thus offering little resistance while crumpling.

The bar likewise has satisfactory behavior during a high-speed compatibility impact. One reason for this is that the frontal bearing surface of the bar is relatively large in relation to the space available in the bumper. The "H" shape of the bar makes it possible to give the front wall 4 a large frontal surface area in which it bears on the test barrier, this height being adjustable as a function of the height available in the bumper. This very advantageous feature is not available with a "C"-shaped bar open toward the rear as is sometimes the case in the prior art, in which the angle required for the removal of the piece from the mold generally makes it necessary to reduce the frontal bearing surface of the bar. The rigidity of the bar will be a function of the modulus of the materials used. Thus it will be preferable to have a relatively high level of fiber reinforcement and to arrange continuous unidirectional fibers in the front and rear walls. The thickness of the front and rear walls likewise affects rigidity. The "V"-shaped intermediate wall 26, in particular, prevents the front wall from deforming excessively in front of the barrier. The web 14 makes it possible to maintain the position of the front and rear walls and the intermediate wall 26 and internal walls 24, 28.

The presence of the ribs 16, 20 between the front wall and the longitudinal member makes it possible to stabilize the bar while it is crumpling and to prevent the appearance of a stress peak.

In the web, use will preferably be made of a material reinforced with a glass fabric (such as that sold under the name "EMIR") containing continuous fibers to maintain the integrity of the bar during the impact.

The intermediate walls 24 and 28 improve the behavior of the bar during a "DANNER" impact. During a high-speed impact, they ensure that forces are transmitted toward the opposite side from the impact and stabilize the absorbers formed by the cells 21.

This bar is lighter than most bars of the same type. In terms of cost, it is substantially equivalent to a conventional sheet-metal bar. It is substantially lighter than a sheet-metal bar. Another advantage is that it crumples more than most conventional bars during impact, it being possible to increase this crumpling by 20 mm, for example, opposite the longitudinal members.

The bar allows the arrangement of a lifting hook 40 connected to one of the longitudinal members.

In experiments, the applicant has surprisingly found that the shape of this web improved very considerably the behavior of the bar during an impact, in particular during an urban impact. In fact, the undulating shape allows the web to concertina during a frontal impact, such that the bar poses moderate resistance to crumpling in the sections where the web is present. In contrast to a conventional "H"-section bar with a strictly flat web, in which the web plays a dominant role in guiding the crumpling of the bar, in the bar according to the invention the undulating web plays a minor role in guiding the crumpling, the crumpling being determined in large measure by other parts of the bar. However, the behavior of the bar during the impact can be significantly influenced by modifying the amplitude of the undulation and the dimensions of the web, in particular its thickness.

Of course, during any of the impacts mentioned above, the overall structure of the bar influences its behavior. Thus, even if certain parts of the bar have a decisive effect on this behavior, it remains difficult to identify precisely the exact role played by any particular part of the bar. This is the case particularly with the undulating web mentioned above, the function of which during an impact depends on the construction of other parts of the bar (possible presence of ribs intermediate walls, transverse walls etc.).

Numerous modifications could, of course, be made to the invention without exceeding the scope of the latter. For example, the number of ribs 16 can advantageously be between 3 and 5. The number of ribs 20 can likewise be varied.

What is claimed is:

1. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section and the bar (2) has at least two zones (8, 10) in which, in cross section, the web (14) has an average thickness less than an average thicknesses of the front (4) and rear (6) walls and said zones are each closer to respective ends of the bar than to a middle of the bar.

2. The bar as claimed in claim 1, wherein the average thickness of the web (14) is between 0.25 and 0.75 times the average thicknesses of the front (4) and rear (6) walls.

3. The bar as claimed in claim 1 which, in the two zones (10) each closer to the respective ends of the bar than to the middle of the bar, comprises at least one rib (16) perpendicular to the front (4) and rear (6) walls and to the web (14).

4. The bar has claimed in claim 3, wherein the two zones (10) each further comprises at least two ribs (16).

5. The bar as claimed in claim 3, wherein the at least two ribs (16) of the two zones (10) are connected to one another by reinforcing ribs (20), in particular ribs parallel to the front (4) and rear (6) walls.

6. The bar as claimed in claim 1 which, in the two zones (10) each closer to the respective ends of the bar than to the middle of the bar, comprises at least one cell (21) extending between the front (4) and rear (6) walls.

7. The bar as claimed in claim 1 wherein the at least one zone (10) extends at right angles to a location (18) for fixing the bar (2) to longitudinal members (12).

8. The bar as claimed in claim 1 which comprises at least one internal wall (24, 28) parallel to the front (4) and rear (6) walls.

9. The bar as claimed in claim 8, further comprising at least two internal walls (24, 28).

10. The bar as claimed in claim 1 which comprises, in particular in a central zone (8) of the bar, at least one intermediate wall (26) at an angle to the front (4) and rear (6) walls and perpendicular to the web (14).

11. The bar as claimed in claim 10, wherein the intermediate wall (26) forms a "V" when viewed from above.

12. The bar as claimed in claim 11, wherein the point of the "V" extends in the direction of the front wall (4).

13. The bar as claimed in claim 10 wherein the length (1) of the central zone (8) is at least equal to one third of the total length (L) of the bar (2).

14. The bar as claimed in claim 1 which is produced from plastic material reinforced by glass fibers (44).

15. The bar as claimed in claim 14, wherein the fibers (44) are unidirectional and continuous, at least in the front (4) and rear (6) walls.

16. A bumper for a motor vehicle, which comprises a bar as claimed in claim 1 and a skin (32).

17. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section and the bar (2) has at least one zone (8, 10) in which, in cross section, the web (14) has an average thickness between 0.25 and 0.75 times the average thicknesses of the front (4) and rear (6) walls.

18. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section, and which, in two zones (10) each closer to respective ends of the bar than to a middle of the bar, comprises at least one rib (16) perpendicular to the front (4) and rear (6) walls and to the web (14).

19. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section, and which, in two zones (10) each closer to respective ends of the bar than to a middle of the bar, comprises at least one cell (21) extending between the front (4) and rear (6) walls.

20. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section, and the bar (2) has at least one zone (8, 10) in which, in cross section, the web (14) has an average thickness less than average thicknesses of the front (4) and rear (6) walls, and the at least one zone (10) extends at right angles to a location (18) for fixing the bar (2) to longitudinal members (12).

21. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section, and at least one internal wall (24, 28) parallel to the front (4) and rear (6) walls.

22. A bumper bar (2) for a motor vehicle, comprising front (4) and rear (6) walls and an intermediate web (14) extending from the front wall to the rear wall so as to form with the latter an "H"-shaped section, wherein the web has an undulating shape in cross section, and, in particular in a central zone (8) of the bar, at least one intermediate wall (26) at an angle to the front (4) and rear (6) walls and perpendicular to the web.

* * * * *